United States Patent [19]

Wagstaff et al.

[11] 3,985,306

[45] Oct. 12, 1976

[54] FACILITATING EASY ACCESS TO A SHEARBAR ON A FORAGE HARVESTER

[75] Inventors: Robert A. Wagstaff, New Holland; Henry N. Lausch, Denver, both of Pa.

[73] Assignee: Sperry Rand Corporation, New Holland, Pa.

[22] Filed: Aug. 15, 1975

[21] Appl. No.: 605,099

[52] U.S. Cl. .............................. 241/222; 241/167; 241/290
[51] Int. Cl.$^2$ .................... B02C 18/06; B02C 18/22
[58] Field of Search ............... 241/101.7, 167, 222, 241/285 R, 286, 287, 289, 290

[56] References Cited
UNITED STATES PATENTS

| 3,342,231 | 9/1967 | Waldrop | 241/167 UX |
|---|---|---|---|
| 3,431,712 | 3/1969 | Probsting | 241/222 X |
| 3,444,673 | 5/1969 | Evans | 241/222 X |
| 3,635,271 | 1/1972 | Markham | 241/101.7 X |
| 3,876,159 | 4/1975 | Kidd | 241/289 X |

Primary Examiner—Granville Y. Custer, Jr.
Assistant Examiner—Howard H. Goldberg
Attorney, Agent, or Firm—John R. Flanagan; Frank A. Seemar; Michael R. Swartz

[57] ABSTRACT

In a forage harvester having a rotatable cutterhead and adjacently-positioned shearbar, an upper rear feed roll is mounted above and forwardly of the shearbar for pivotal movement relative to an upper front feed roll by a pair of arms which interconnect the rolls. A tensioning assembly is coupled to each of the arms. An actuatable latching mechanism is connecting to the tensioning assembly and movable to a first position for placing the tensioning assembly in a first condition in which the rear feed roll is biased toward a lower operative position adjacent the cutterhead and shearbar. The latching mechanism is also movable to a second position for placing the tensioning assembly in a second condition in which the bias on the rear feed roll is relaxed, whereby the rear feed roll may now be pivotally moved relative to the front feed roll to an upper inoperative position generally above the front feed roll and remote from the cutterhead and shearbar to thereby expose and render the shearbar readily accessible for servicing.

37 Claims, 4 Drawing Figures

FACILITATING EASY ACCESS TO A SHEARBAR ON A FORAGE HARVESTER

BACKGROUND OF THE INVENTION

1. Field of the Invention

The present invention relates generally to forage harvesters and, more particularly, is concerned with improvements therein which facilitate easy access to the shearbar on the forage harvester for servicing and maintenance purposes.

2. Description of the Prior Art

In order to maintain the operating efficiency of a forage harvester of the type having a rotatable cutterhead with knives spaced about the periphery thereof and an adjacently-positioned, stationary shearbar cooperable with the cutterhead knives to comminute crop material, it is necessary to maintain a desired uniform clearance between the shearbar and the cutterhead knives, such as from 0.010 to 0.015 inch, as the knives move pass the shearbar upon rotation of the cutterhead. Therefore, during the harvesting season, the clearance between the shearbar and the cutterhead knives must be guaged on a regular, periodic basis by the operator and adjustment of the shearbar made when needed. Otherwise, if the clearance is not checked closely and non-uniformity thereof occurs, the result will be non-uniformity or uneveness in the length of cut of the crop material being comminuted from one end of the cutterhead to the other which will cause greater power consumption and more fuel usage in the operation of the forage harvester.

Such forage harvesters also include tandemly-arranged front and rear points of upper and lower feed rolls located forwardly of the cutterhead and shearbar. The lower rear roll has a smooth outer cylindrical surface and a scraper is mounted adjacent to and forwardly of the scraper for cleaning the surface of the smooth lower rear roll. As in the case of the shearbar, it is necessary to maintain proper clearance between the scraper and the smooth lower roll in order to prevent buildup of crop material residue on it which would adversely affect the operating efficiency of the forage harvester.

It is therefore highly desirable to make the shearbar and cutterhead area and the scraper and lower rear feed roll area of the forage harvester readily accessible so that it will be convenient for the operator to give close attention to the shearbar/cutterhead and scraper/roll clearances on a regular basis. However, most of the forage harvesters heretofore have not offered a convenient, simple or easy method of gaining quick access to one or both of these areas for such servicing and maintenance purposes.

One method currently being utilized on commercial forage harvesters is to provide a small door on one side of the cutterhead housing adjacent the shearbar/scraper mount which may be opened and a feeler guage then inserted by the operator to check the clearance between the shearbar and the cutterhead knives and between the scraper and the smooth feed roll. However, such method allows little visual contact by the operator with the area being guaged and limits full reach of the feeler guage across the total width of the shearbar. Instead, the operator must rely mostly on his blind feel with the guage. As a result, operators will have a tendency to neglect making frequent adjustments to the shearbar and scraper clearances due to the difficulty in carrying through on the checking procedure.

Another current method is to provide the upper feed rolls mounted to an upper transition and spout assembly, all of which may be pivoted as a unit rearwardly and away from the remainder of the housing so that the cutterhead, shearbar, scraper and smooth feed roll are exposed from above. Although this method provides greater accessibility to the shearbar and scraper areas by the operator once the unit has been pivoted out of the way, the transition and spout assembly is somewhat bulky and heavy and thus is difficult and awkward to lift and pivot. As a result, operators will likewise with this method have a tendency to put off making frequent adjustments to the shearbar and scraper clearances since it is just not a simple and quick solution to the problem of shearbar/scraper accessibility.

SUMMARY OF THE INVENTION

The present invention promotes greater attentiveness on the part of the operator to shearbar and scraper clearance adjustments and thereby contributes to the attainment of improved overall operating efficiency of the forage harvester and the production of a better quality forage product.

Accordingly, in a forage harvester, the present invention broadly comprises the combination of a housing, a rotatable cutterhead mounted in the housing, a shearbar mounted in the housing forwardly of and closely adjacent to the cutterhead and cooperable therewith for comminuting crop material, front and rear upper rotatable feed rolls generally tandemly-arranged and supported in the housing forwardly of the cutterhead and shearbar, the rear roll being disposed in close proximity to and forwardly of the cutterhead and shearbar when the rear roll is in a lower operative feeding position, lower movable feed means mounted in the housing and cooperable with the upper feed rolls for conveying crop material to the cutterhead across the shearbar, means mounting the rear roll for pivotal movement from the lower operative feeding position to an upper inoperative position generally above the front feed roll and remote from the cutterhead and shearbar to thereby expose and render the shearbar readily accessible for servicing or the like, tensioning means coupled to said mounting means, and actuatable means mounted to the housing and connected to the tensioning means. The actuatable means is movable to a first position for placing the tensioning means in a first condition in which the rear feed roll is biased toward its lower position. Also, the actuatable means is movable to a second position for placing the tensioning means in a second condition in which the bias on the rear feed roll is relaxed for facilitating movement of the rear feed roll to its upper position.

More particularly, the mounting means comprises a pair of arms rotatably connected to and extending between opposite ends of the upper rolls and the tensioning means comprises a pair of assemblies, each of the assemblies including a tension spring and a flexible cable or the like interconnected at one end to one of the arms and at an opposite end to one end of the spring. The actuatable means includes a shaft rotatably mounted to the housing and a crank member fixed to and extending generally radially outwardly from each opposite end of the shaft, each of the springs of the pair of tensioning assemblies being interconnected at an opposite end to an outer end of one of the crank members. Further, a handle is attached to one of the crank members for facilitating movement of the actuatable means between its first and second positions. Also, a lever is attached to one of the pivotal arms for facilitating pivotal movement of the arms and thereby the rear feed roll between its lower operative and upper inoperative positions when the actuatable means is at its second position.

Still more particularly, the housing is provided with a top opening and a removable cover for normally closing the housing top opening. Accordingly, when the cover has been removed from the housing top opening and the actuatable means moved to its second position, the rear feed roll may be moved from its lower operative position through the housing top opening to its upper inoperative position to thereby expose the shearbar and render it accessible for servicing through the housing top opening.

The present invention also broadly comprises, in a forage harvester, the combination of a housing having a top opening defined therein, a removable cover for normally closing the housing top opening, means mounted in the housing for comminuting crop material, upper feed means mounted in the housing generally below the top opening therein and forwardly of the comminuting means, the housing including means supporting the upper feed means so as to allow the upper feed means to be moved upwardly toward the housing top opening and removal of the upper feed means through the housing top opening when the cover has been removed, lower feed means mounted in the housing and cooperable with the upper feed means for conveying crop material to the comminuting means, tensioning means interconnected to the upper feed means, and actuatable means mounted to the housing and interconnected to the tensioning means, at least one of the interconnection of the tensioning means with the upper feed means or of the tensioning means with the actuatable means being disconnectible. The actuatable means is movable to a first position for placing the tensioning means in a first condition in which the upper feed means is biased toward the lower feed means. Also, the actuatable means is movable to a second position for placing the tensioning means in a second condition in which the bias on the upper feed means is relaxed for facilitating disconnecting of one of the interconnections and thereby removal of the upper feed means through the housing top opening when the cover has been removed.

The present invention provides a quick and easy method of exposing both the cutterhead, shearbar, scraper and smooth feed roll merely by relaxing the tension imposed on the upper feed rolls and then pivoting the rear upper feed roll to above the front upper feed roll and away from the shearbar. Whether access to the shearbar and scraper area is to be gained through a removable top cover on the housing or through a door in the side of the housing, substantially better visual contact by the operator with the shearbear and scraper area is achieved and a more convenient avenue for shearbar and scraper adjustment is provided requiring less effort on the part of the operator than heretofore.

Another advantage gained from the present invention is the ease of removal of the upper feed means through the housing top opening which enhances the operator's ability to perform other servicing or maintenance procedures on the forage harvester when necessary.

These and other advantages and attainments of the present invention will become apparent to those skilled in the art upon a reading of the following detailed description when taken in conjunction with the drawings in which there is shown and described an illustrative embodiment of the invention.

BRIEF DESCRIPTION OF THE DRAWINGS

In the course of the following detailed description reference will be frequently made to the attached drawings in which.

DETAILED DESCRIPTION OF THE INVENTION

In the following description, right hand and left hand reference are determined by standing at the rear of the machine and facing in the direction of forward travel. Also, in the following description, it is to be understood that such terms as "forward", "rearward", "left", "upwardly", etc., are words of convenience and are not to be construed as limiting terms.

IN GENERAL

Figure 1:
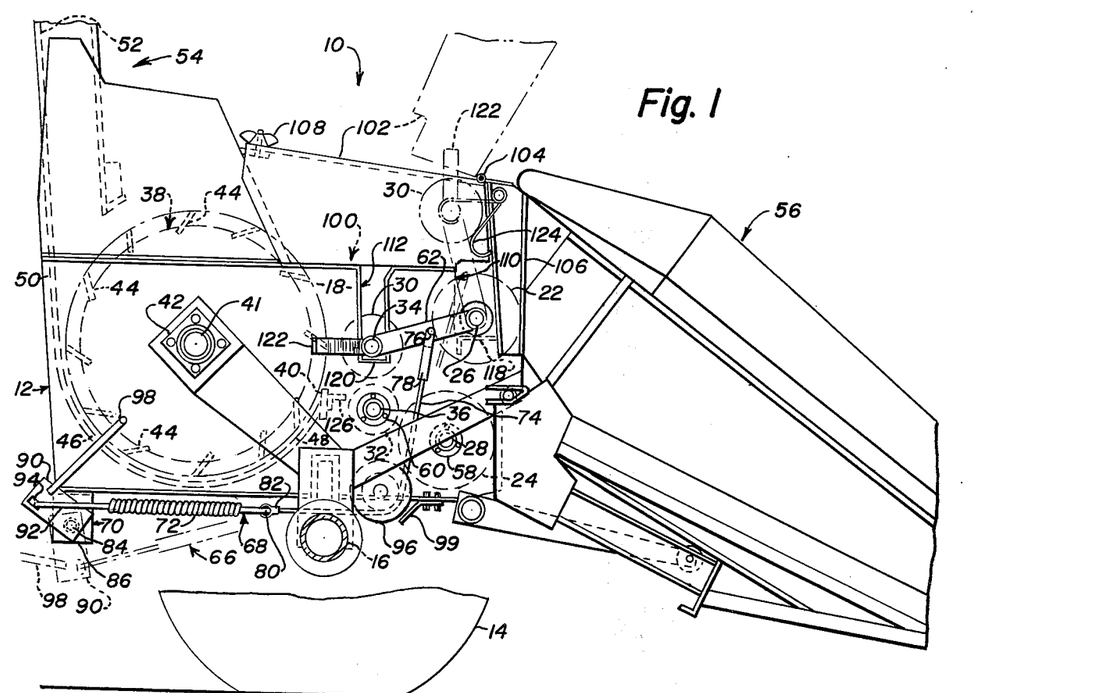
FIG. 1 is a partial right side elevational view of a forage harvester embodying the principles of the present invention.
Figure 2:
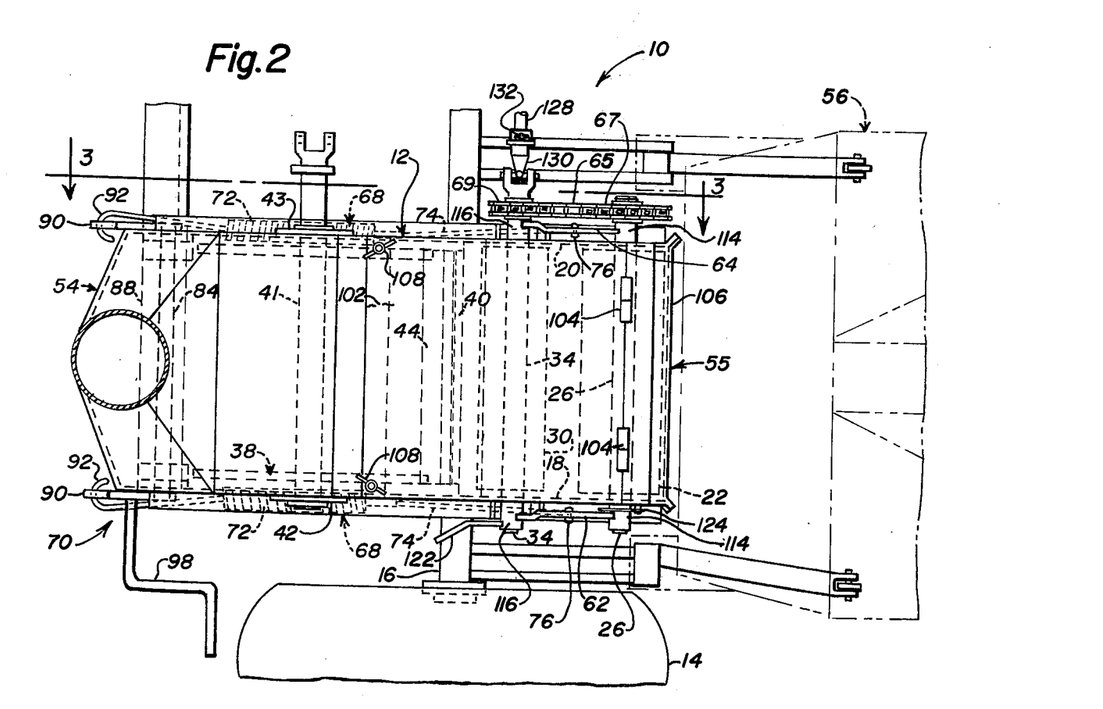
FIG. 2 is a partial top plan view of approximately the right half of the forage harvester of FIG. 1.

Referring now to the drawings, and particularly to FIGS. 1 and 2, there is partially shown a forage harvester, generally indicated by numeral 10, forming the preferred embodiment of the present invention (the right side of the forage harvester being shown in FIG. 1 when one is standing to the rear of the machine and facing in the direction of forward travel). Although the forage harvester illustrated is a pull-type machine, the principles of the present invention may just as readily be incorporated into a self-propelled machine or a tractor-mounted machine.

The machine 10 is provided with a housing, generally designated 12, which is supported for movement across a field by a pair of spaced apart ground-engaging wheels 14 (only the right wheel being partially shown) being rotatably attached to opposite ends of a transversely-extending axle member 16 (only the right half of which is shown) fixed across the bottom of the housing 12. The housing 12 includes a pair of spaced apart vertical sidewalls 18, 20 between which are mounted crop material feeding and comminuting components hereinafter described.

First feeding components in the form of front upper and lower feed rolls 22, 24, which respectively include shafts 26, 28, are rotatably mounted within the housing 12 in vertically spaced relationship between housing sidewalls 18, 20 and in transverse relationship to the forward direction of machine travel. The front rolls each have aggressive peripheral surfaces for feeding crop material rearwardly between the rolls.

Second feeding components in the form of rear upper and lower feed rolls 30, 32, which respective include shafts 34, 36, are rotatably mounted within the housing 12 in vertically spaced relationship between housing sidewalls 18, 20 and in transverse relationship to the forward direction of machine travel. The rear rolls 30, 32 are aligned rearwardly of the front rolls 22, 24 so as to receive the crop material therefrom and compress it into a layer while feeding the same rearwardly between the rolls 30, 32.

For comminuting the crop material, a knife-bearing cylindrical cutterhead 38 and a shearbar 40 are positioned rearwardly of the second feeding components, the rear rolls 30, 32. The cutterhead 38, which includes a shaft 41, is rotatably mounted within the housing 12 between the housing sidewalls 18, 20 rearwardly of the rear rolls 30, 32 and in transverse relationship to the forward direction of machine travel. The outer ends of the cutterhead shaft 41 respectively extend through openings (not shown) in the sidewalls 18, 20 and are rotatably journalled in respective bearing blocks 42, 43 being fixed to the sidewalls 18, 20 about the shaft-receiving openings. The transverse shearbar 40 is adjustably mounted in a known manner between the housing sidewalls 18, 20 in a stationary position closely adjacent to the forward side of the cutterhead 38 so as to provide a predetermined clearance therebetween and aligned with the rear feed rolls 30, 32 such that the layer of crop material being fed rearwardly by rear rolls 30, 32 moves above and across the shearbar 40 and into the path of a series of knives 44 being arranged in spaced apart relationship about the periphery of the cutterhead 38. By such arrangement, the crop material fed to the cutterhead 38 and shearbar 40 is comminuted, chopped or cut into small pieces, commonly referred to as silage.

The housing 12 further includes an arcuate wall 46 extending between the sidewalls 18, 20 and generally underlying and concentric with the lower side of the cylindrical cutterhead 38. The arcuate wall 46 at its forward end 48 is disposed adjacent to and rearwardly of the shearbar 40 and extends generally upwardly at its rearward end 50 to merge with the rear wall 52 of a tubular discharge spout assembly 54. As the cutterhead 38 is rotated so as to successively move its knives 44 closely past the shearbar 40 and cut any crop material being fed rearwardly across and past the shearbar 40, the cut crop material is propelled by the cutterhead along the arcuate wall 46 and thrown upwardly and outwardly through an upper, generally rearwardly curved portion (not shown) of the discharge spout assembly 54 into a trailing wagon (not shown) being towed behind the forage harvester 10.

Crop material is fed through a front inlet end 55 (FIG. 2) of the housing 12, being defined between the forward edges of the sidewalls 18, 20, to the front rolls 22, 24 by a suitable header 56 mounted on the forward end of the forage harvester 10 in a conventional manner. While the header partially illustrated is a conventional row crop type, a conventional windrow pickup type header may also be used for delivering windrowed crop material from the field to the front feed rolls.

The left half of the axle member 16 (not shown) mounts conventional drive mechanisms for the feeding and comminuting components of the forage harvester 10 and also mounts a forwardly-extending draft member by which the machine may be coupled to a tractor or the like for towing the machine across the field. Illustration and further description of drive mechanisms and draft member of the forage harvester are unnecessary for a complete understanding of the present invention since they form no part of the present invention.

The forage harvester, as heretofore broadly described, is generally conventional. Hereinafter, the improved pivotal relationship between the upper feed rolls 22, 30 and the cooperative relationship of the biasing mechanism associated therewith as well as other improvements which combine to facilitate improved access to the shearbar and cutterhead area of the forage harvester will be described in detail.

REAR UPPER FEED ROLL PIVOT ASSEMBLY

Substantially in the same manner as heretofore provided on conventional forage harvesters, the front and rear lower feed rolls 24, 32 of the forage harvester 10 are disposed in a fixed positional relationship with respect to the housing sidewalls 18, 20. The opposite outer ends of the front and rear lower feed roll shafts 28, 36 respectively extend through openings (not shown) in the sidewalls 18, 20 and are rotatably journalled in respective bearing elements 58, 60 being fixed to the sidewalls 18, 20 about the shaft-receiving openings therein. Mounting means in the form of a pair of arms 62, 64 are provided being rotatably journalled at their respective opposite ends to the opposite outer ends of the front and rear upper feed roll shafts 26, 34 to thereby provide the rolls 22, 30 in a predetermined tandem arrangement.

Figure 3:
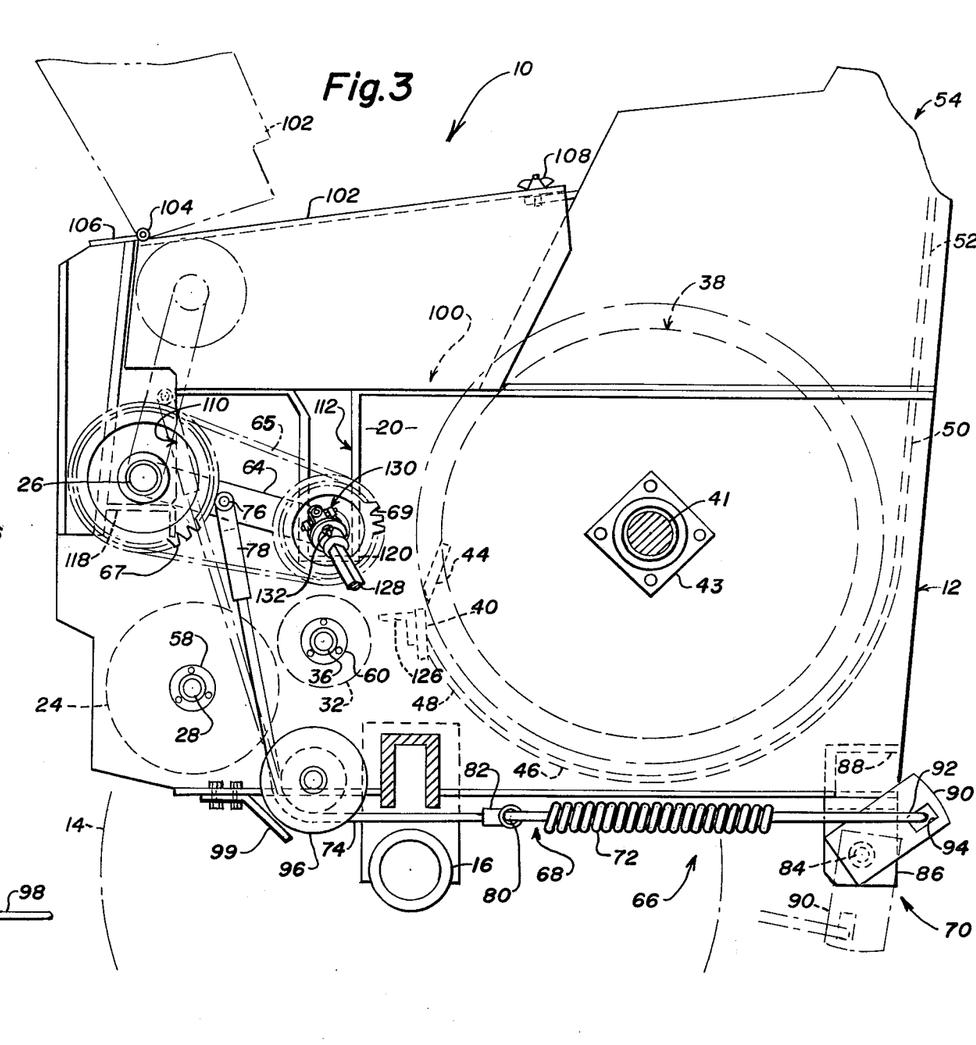
FIG. 3 is a partial left side elevational view taken along line 3—3 of FIG. 2, showing the forage harvester of FIGS. 1 and 2 on a somewhat enlarged scale.

Heretofore in conventional forage harvesters, short vertically-extending slots or openings were defined in and enclosed by the housing sidewalls through which the outer ends of upper roll shafts extended and upwardly within which the shaft ends could move whenever a slug of crop material of abnormal size was fed between the fixed and movable lower and upper feed rolls. Cylindrical end portions on the interconnecting arms (similar to arms 62, 64 of forage harvester 10) rotatably received and supported the shaft ends normally at the lower ends of the sidewall slots. Further, heretofore, tension springs were attached to the arms and to respective brackets on the housing sidewalls below the arms which allowed flotation of the upper rolls upwardly away from the lower rolls whenever such a slug of crop material was fed therebetween, but would return the upper rolls to their normal lower position once the slug had passed. Still further, heretofore, the upper feed rolls were drivingly coupled together at their respective left ends, such as in the case of upper rolls 22, 30 by chain 65 and respective sprockets 67, 69 as illustrated in FIGS. 2 and 3. Therefore, the interconnecting arms maintained a predetermined positional relationship between the upper rolls even during vertical movement thereof such that the operative drive connection therebetween was not disrupted.

In contrast to the limited extent of vertical movement allowed by the mounting and tensioning arrangement of the upper rolls as heretofore provided on forage harvesters, the preferred embodiment of the present invention provides the capability of pivotally moving the rear upper roll 30 relative to the front upper roll 22 from a lower operative feeding position in which rear upper roll 30 is disposed in close proximity to and forwardly of the cutterhead 38 and shearbar 40, as seen in solid line form in FIG. 1, to an upper inoperative position, as seen in broken line form in FIG. 1, in which the rear upper roll 30 is disposed generally above the front upper roll 22 and remote from the cutterhead 38 and shearbar 40 to thereby expose and render the shearbar 40 readily accessible for the aforementioned servicing and maintenance procedures.

While the continued use of interconnecting arms, such as arms 62, 64, between upper rolls 22, 30 in the construction of the present invention is preferred, it will be apparent that other mounting arrangements, such as a pair of parallel pivotal arms instead of each single arm, could be provided to mount the rear upper roll 30 to the housing sidewalls 18, 20 (independent of any connection with the front upper roll 22) for pivotal movement between the lower operative and upper inoperative positions without disrupting the drive connection between the front and rear upper rolls 22, 30.

For facilitating the above-described pivoting capability of the rear upper roll 30, means, generally designated by numeral 66, is coupled between the pivotal arms 62, 64 and the housing 12 in a manner which normally biases the rear upper roll 30 toward its lower position, the biasing means 66 further being relaxable for facilitating pivotal movement of the upper rear roll 30 to its upper position.

Figure 4:
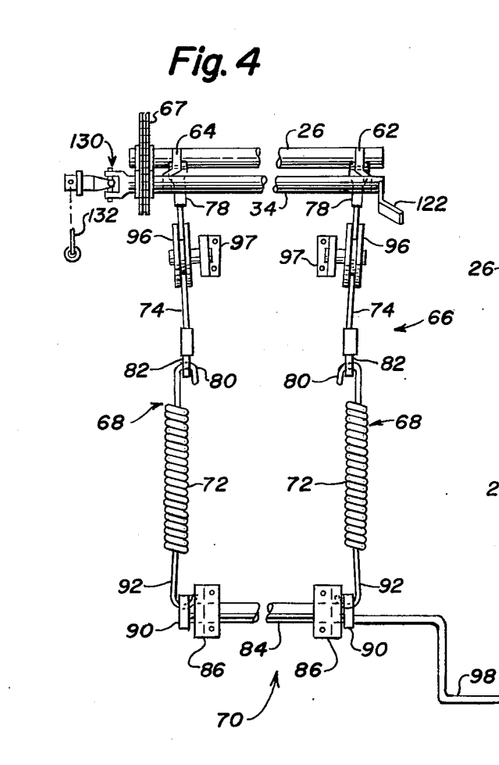
FIG. 4 is a diagrammatic representation of the tensioning assemblies and actuatable latching mechanism on the forage harvester for controlling the position of the upper feed rolls.

As clearly seen in FIG. 4, the biasing means 66 includes a pair of tensioning assemblies 68, each being coupled to one of the arms 62, 64, and actuatable latching means 70 connected to the tensioning assemblies 68. The latching means 70 is movable to a first position, as seen in solid line form in FIGS. 1 and 3, for placing the tensioning assemblies 68 in a first condition in which the rear upper roll 30 is biased through the arms 62, 64 toward its lower position. Also, the latching means 70 is movable to a second position, as seen in broken line form in FIGS. 1 and 3 (and in solid line form in FIG. 4), for placing the tensioning assemblies 68 in a second condition in which the bias on the rear upper roll 30 through the arms 62, 64 is relaxed for facilitating movement of the rear upper roll 30 to its upper position.

Each of the tensioning assemblies 68 includes an elongated tension spring 72 and a flexible cable 74. One end of the cable 74 is interconnected to one of the arms 62, 64 by a pin 76 placed through a clevis 78 fixed on the one end of the cable 74 and a hole in the arm located intermediately between the opposite ends of the arm. The opposite end of the cable 74 is interconnected to one end of the spring 72 by a first hook portion 80 on the one spring end which extends through an eyelet 82 fixed on the opposite cable end.

The actuatable latching means 70 includes a transversely-extending shaft 84 rotatably mounted adjacent the opposite ends thereof in brackets 86 which are fixed to the underside of housing frame member 88 at the lower rear side of the housing 12. Also, the latching means 70 includes a crank member 90 fixed to and extending generally radially outwardly from each opposite end of the rotatable shaft 84. Each of the tension springs 72 is interconnected at an opposite end to an outer end of one of the crank members 90 by a second hook portion 92 on the opposite spring end which extends through an opening 94 formed in the outer end of the crank member 90.

Further, guide elements in the form of pulleys 96 are rotatably mounted to the exterior sides of the respective housing sidewalls 18, 20 by brackets 97 at corresponding locations generally below the opposite ends of the rear lower roll 32. Each of the cables 74 extend along one of the housing sidewalls 18, 20 and past and partially about a respective one of the pulleys 96.

For facilitating rotation of the shaft 84 of the latching means 70, there is provided a handle 98 fixed to an outer end of the right one of the crank members 90. When the latching means 70 is disposed in its first position, as seen in solid line form in FIGS. 1 and 3, the tension springs 72 of assemblies 68 are somewhat extended or stretched (placed in the first condition) which through the cables 74 impose a downward pulling force or bias on the arms 62, 64 since the crank members 90 are prevented from rotating forwardly to allow relaxation of the springs 72 due to abutment of their upper edges against the lower rear corner of the housing frame member 88. In order to place the tensioning assemblies 68 in their second condition, the operator must grasp the handle 98 and rotate it in a counterclockwise direction as seen in FIG. 1. Some minimal effort must be exerted by the operator to accomplish this since the pulling force of springs 72, which must be overcome in rotating the crank members 90 counterclockwise, increases until the location of the connection of second hook portions 92 of the springs 72 with the arms 90 at openings 94 has passed below the axis of rotation of shaft 84. Once the location has passed the shaft axis, the pulling force decreases and the operator merely retains his hold on the handle 98, allowing downward and forward rotation of the crank members 90 until the tension springs 72 are fully relaxed (assume the second condition). Sufficient slack is now available in cables 74 to facilitate pivoting of the upper rear roll 30 to its upper position. Tabs 99 fixed to the housing 12 adjacent the pulleys 96 retain the cables 74 on the pulleys 96 when the cables 74 are slackened.

The upper horizontal edges of housing sidewalls 18, 20 define therebetween a top opening, generally designated 100, in the housing 12. A cover 102 pivotally connected by hinges 104 to housing frame member 106 normally closes the top opening 100. The cover 102 may be pivoted upwardly, after unfastening wing nut 108 from spout assembly 54, from its lower solid line position to its upper broken line position, as seen in FIGS. 1 and 3, to uncover the housing top opening 100.

A pair of vertically-extending slots 110, 112 are formed in each of the housing sidewalls 18, 20. The opposite ends of front and rear upper roll shafts 26, 34 extend outwardly through the pairs of slots 110, 112. Cylindrical opposite end portions 114, 116 of each of the arms 62, 64 which rotatably mount the ends of the roll shafts 26, 34 extend inwardly into the slots 110, 112 and are normally supported at the lower ends of the slots 110, 112 by support structures 118, 120 fixed to housing sidewalls 18, 20. The slots 110, 112 communicate with or open into the housing top opening 100 and, therefore, allow for the rear upper feed roll to be pivotally moved upwardly through the housing top opening after the cover 102 has been unfastened and pivoted to its upper position.

A lever 122 is attached to the right one of the arms 62, 64 which may be grasped by the operator and lifted to pivot the rear upper roll 30 from its lower to its upper position. Also, once the roll 30 has been moved to its upper position, it may be retained there by connecting a hook 124 to it which is movably mounted to the right side of the housing frame member 106.

It is readily apparent that with the upper rear roll 30 now located at its upper position, there is nothing to obstruct the operator's line of vision and physical access to the shearbar 40 through the housing top opening 100. Also, since most forage harvesters utilize a scraper member 126 mounted forwardly of and adjacent to the shearbar 40 which when properly adjusted prevent buildup of crop material on the rear lower feed roll which has a smooth outer surface, it will be seen that when the upper rear roll 30 is located at its upper position, adjustments to the scraper member 126 may also be easily accomplished due to access thereto through the housing top opening 100.

It should be pointed out that, in the preferred form of the present invention, a drive shaft 128, which is normally coupled to a universal joint 130 on the left end of the rear upper roll shaft 34, must be disconnected after removal of pin 132 before the roll 30 may be pivoted to its upper position. However, other conventional drive arrangements may be substituted which would obviate the necessity of performing such disconnection precedent to pivoting the rear upper roll 30.

Another advantage provided by the present invention is the ease of removal of the upper rolls 22, 30 as a unit through the housing top opening 100. Once the tension springs 72 have been relaxed, either the cable eyelets 82 may be readily disconnected from the first hook portions 80 of the springs 72 or the cable clevises 78 may be disconnected from the arms 62, 64 by removal of pins 76. Then the upper rolls 22, 30 being interconnected by arms 62, 64 may be lifted up through the housing top opening 100 as a unit. This greatly simplifies removal of the upper rolls for servicing thereof or for inspection and servicing of the lower rolls 24, 32.

Finally, it should be understood that the above-described steps for either pivoting the rear upper roll 30 or for removing the upper rolls 22, 30 as a unit may be performed by the operator without the use of a wrench or other tool. Further, it is readily apparent that the rear upper roll 30 may be pivoted back to its lower operative position or the upper rolls as a unit replaced within the housing 12 merely by reversing the above-described steps.

It is thought that the invention and many of its attendant advantages will be understood from the foregoing description and it will be apparent that various changes may be made in the form, construction and arrangement of the parts described without departing from the spirit and scope of the invention or sacrificing all of its material advantages, the from hereinbefore described being merely an exemplary embodiment thereof.

We claim:
1. In a forage harvester, the combination comprising:
 a housing;
 a rotatable cutterhead mounted in said housing;
 a shearbar mounted in said housing forwardly of and closely adjacent to said cutterhead and cooperable therewith for comminuting crop material;
 front and rear upper rotatable feed rolls generally tandemly-arranged and supported in said housing forwardly of said cutterhead and said shearbar, said rear roll being disposed in close proximity to and forwardly of said cutterhead and shearbar when said rear roll is in a lower operative feeding position;
 lower feed means mounted in said housing and cooperable with said upper feed rolls for conveying crop material to said cutterhead across said shearbar;
 means mounting said rear feed roll for pivotal movement from said lower operative feeding position to an upper inoperative position generally above said front feed roll and remote from said cutterhead and shearbar to thereby expose and render said shearbar readily accessible for servicing or the like;
 tensioning means coupled to said mounting means; and
 actuatable means mounted to said housing and connected to said tensioning means, said actuatable means being movable to a first position for placing said tensioning means in a first condition in which said rear feed roll is biased toward its lower position, said actuatable means also being movable to a second position for placing said tensioning means in a second condition in which said bias on said rear feed roll is relaxed for facilitating movement of said rear feed roll to its upper position.

2. The combination as recited in claim 1, wherein:
 said mounting means comprises a pair of arms rotatably connected to opposite ends of said rear roll and said front roll, said arms mounting said rear roll for pivotal movement between said lower and upper positions, said tensioning means being coupled to said arms.

3. The combination as recited in claim 2, further comprising:
 a lever attached to one of said arms for facilitating pivotal movement of said arms and, thereby said rear feed roll, between its lower operative and upper inoperative positions when said actuatable means is at its second position.

4. The combination as recited in claim 1, wherein:
 said tensioning means comprises a pair of assemblies, each of said assemblies including a tension spring and a flexible means interconnected at one end to said mounting means and at an opposite end to one end of said spring; and
 said actuatable means includes a shaft rotatably mounted to said housing and a crank member fixed to and extending generally radially outwardly from each opposite end of said shaft, each of said springs of said assemblies being interconnected at an opposite end to an outer end of one of said crank members.

5. The combination as recited in claim 4, further comprising:
 a handle attached to one of said crank members for facilitating movement of said actuatable means between its first and second positions.

6. The combination as recited in claim 4, further comprising:
 a pair of guide elements mounted to said housing, each of said flexible means extending past and at least partially about a respective one of said guide elements.

7. The combination as recited in claim 6, wherein:
 each of said guide elements is comprised by a pulley being rotatably mounted to said housing.

8. The combination as recited in claim 1, further comprising:
 means coupled to said housing and attachable to said rear feed roll when at its upper position for retaining said rear roll at such position.

9. The combination as recited in claim 8, wherein:
 said retaining means is comprised by a movable hook.

10. The combination as recited in claim 1, wherein:
 said lower feed means includes a rotatable rear lower feed roll mounted forwardly of said shearbar and having a generally smooth cylindrical outer surface; and a scraper is mounted in said housing generally between said rear lower roll and said shearbar for preventing buildup of crop material on said lower roll, said scraper and lower roll being exposed and rendered readily accessible for servicing or the like upon pivotal movement of said upper rear roll from its lower operative to upper inoperative positions.

11. In a forage harvester, the combination comprising:
a housing having a top opening defined therein;
a removable cover for normally closing said housing top opening;
a rotatable cutterhead mounted in said housing;
a shearbar mounted in said housing generally below said top opening therein and forwardly of and closely adjacent to said cutterhead, said shearbar being cooperable with said cutterhead for comminuting crop material;
front and rear upper rotatable feed rolls generally tandemly-arranged and supported in said housing generally below said top opening therein and forwardly of said cutterhead and said shearbar, said rear roll being disposed in close proximity to and forwardly of said cutterhead and said shearbar when said rear roll is in a lower operative feeding position;
lower feed means mounted in said housing and cooperable with said upper feed rolls for conveying crop material to said cutterhead across said shearbar;
means mounting said rear feed roll for pivotal movement from said lower operative feeding position through said housing top opening, when said cover has been removed, to an upper inoperative position generally above said housing and remote from said cutterhead to thereby expose and render said shearbar readily accessible for servicing or the like through said housing top opening; and
means coupled between said mounting means and said housing in a manner which normally biases said rear feed roll toward its lower position, said biasing means being relaxable for facilitating movement of said rear roll to its upper position.

12. The combination as recited in claim 11, wherein: said mounting means comprises a pair of arms rotatably connected to opposite ends of said rear roll and said front roll, said arms mounting said rear roll for pivotal movement between said lower and upper positions, said biasing means being coupled to said arms.

13. The combination as recited in claim 12, further comprising:
a lever attached to one of said arms for facilitating pivotal movement of said arms and thereby said rear feed roll between its lower operative and upper inoperative positions when said biasing means is relaxed and said cover has been removed.

14. The combination as recited in claim 11, further comprising:
means coupled to said housing and attachable to said rear feed roll when at its upper position for retaining said rear roll at such position.

15. The combination as recited in claim 14, wherein: said retaining means is comprised by a movable hook.

16. The combination as recited in claim 11, wherein said biasing means includes:
a pair of tensioning assemblies, each assembly being coupled to said mounting means; and
actuatable means connected to said tensioning assemblies and being movable to a first position for placing said assemblies in a first condition in which said rear feed roll is biased toward its lower position, said actuatable means being movable also to a second position for placing said assemblies in a second condition in which said bias on said rear feed roll is relaxed for facilitating movement of said rear feed roll to its upper position.

17. The combination as recited in claim 16, wherein:
each of said tensioning assemblies includes a tension spring and a flexible means interconnected at one end to said mounting means and at an opposite end to one end of said spring; and
said actuatable means includes a shaft rotatably mounted to said housing and a crank member fixed to and extending generally radially outwardly from each opposite end of said shaft, each of said springs of said tensioning assemblies being interconnected at an opposite end to an outer end of one of said crank members.

18. The combination as recited in claim 17, further comprising:
a handle attached to one of said crank members for facilitating movement of said actuatable means between its first and second positions.

19. The combination as recited in claim 17, further comprising:
a pair of guide elements mounted to said housing, each of said flexible means extending past and at least partially about a respective one of said guide elements.

20. The combination as recited in claim 19, wherein: each of said guide elements is comprised by a pulley being rotatably mounted to said housing.

21. The combination as recited in claim 11, wherein: said lower feed means includes a rotatable rear lower feed roll mounted forwardly of said shearbar and having a generally smooth cylindrical outer surface; and
a scraper is mounted in said housing generally between said rear lower roll and said shearbar for preventing buildup of crop material on said lower roll, said scraper and lower roll being exposed and rendered readily accessible for servicing or the like upon pivotal movement of said upper rear roll from its lower operative to upper inoperative positions.

22. In a forage harvester, the combination comprising:
a housing including a pair of spaced apart sidewalls which define a top opening in said housing and have opposing slots formed therein in communication with said top opening;
a removable cover for normally closing said housing top opening;
a rotatable cutterhead mounted in said housing between said sidewalls thereof rearwardly of said slots;
a shearbar mounted in said housing generally below said top opening therein and forwardly of and closely adjacent to said cutterhead, said shearbar being cooperable with said cutterhead for comminuting crop material;
front and rear upper rotatable feed rolls generally tandemly-arranged in said housing between said sidewalls thereof, generally below said top opening therein and forwardly of said cutterhead and said shearbar, said rear roll being aligned between said sidewall slots and disposed in close proximity to and forwardly of said cutterhead and shearbar when said rear roll is in a lower operative feeding position;

shaft means extending axially outwardly from opposite ends of said rear feed roll through said respective sidewall slots beyond said respective housing sidewalls and rotatably supporting said rear feed roll on said sidewalls;

lower feed means mounted in said housing between said sidewalls thereof and cooperable with said upper feed rolls for conveying crop material to said cutterhead across said shearbar;

means respectively disposed outwardly of and along each of said housing sidewalls and journalled to said shaft means at opposite ends of said rear feed roll, said means mounting said rear feed roll for pivotal movement from said lower operative feeding position along said sidewall slots and through said housing top opening, when said cover is removed, to an upper inoperative position generally above said housing and remote from said cutterhead to thereby expose and render said shearbar readily accessible for servicing or the like through said housing top opening; and means coupled between said mounting means and said housing in a manner which normally biases said rear feed roll toward its lower position, said biasing means being relaxable for facilitating movement of said rear roll to its upper position.

23. The combination as recited in claim 22, wherein: another shaft means extends axially outwardly from opposite ends of said front feed roll beyond said respective housing sidewalls and rotatably supports said front roll on said sidewalls; and said mounting means comprises a pair of arms disposed along said respective sidewalls and rotatably connected to said shaft means and said another shaft means, said biasing means being coupled to said arms.

24. The combination as recited in claim 23, further comprising:

a lever attached to one of said arms for facilitating pivotal movement of said arms and thereby said rear feed roll between its lower operative and upper inoperative positions when said biasing means is relaxed and said cover has been removed.

25. The combination as recited in claim 22, further comprising:

means coupled to said housing and attachable to said rear feed roll when at its upper position for retaining said rear roll at such position.

26. The combination as recited in claim 25, wherein: said retaining means is comprised by a movable hook.

27. The combination as recited in claim 22, wherein said biasing means includes:

a pair of tensioning assemblies, each assembly being disposed outwardly of and extending along one of said housing sidewalls and coupled to one of said mounting means; and actuatable means supported by said housing and connected to said tensioning assemblies, said actuatable means being movable to a first position for placing said assemblies in a first condition in which said rear feed roll is biased toward its lower position, said actuatable means being movable also to a second position for placing said assemblies in a second condition in which said bias on said rear feed roll is relaxed for facilitating movement of said rear feed roll to its upper position.

28. The combination as recited in claim 27, wherein: each of said tensioning assemblies includes a tension spring and a flexible means interconnected at one end to one of said mounting means and at an opposite end to one end of said spring; and said actuatable means includes a shaft rotatably mounted to said housing and a crank member fixed to and extending generally radially outwardly from each opposite end of said shaft, each of said springs of said tensioning assemblies being interconnected at an opposite end to an outer end of one of said crank members.

29. The combination as recited in claim 28, further comprising:

a handle attached to one of said crank members for facilitating movement of said actuatable means between its first and second positions.

30. The combination as rectied in claim 28, further comprising:

a pair of guide elements respectively mounted to said housing sidewalls, each of said flexible means extending past and at least partially about a respective one of said guide elements.

31. The combination as recited in claim 30, wherein: each of said guide elements is comprised by a pulley being rotatably mounted to said housing.

32. In a forage harvester, the combination comprising:

a housing having a top opening defined therein;

a removable cover for normally closing said housing top opening;

means mounted in said housing for comminuting crop material;

upper feed means mounted in said housing generally below said top opening therein and forwardly of said comminuting means;

said housing including means supporting said upper feed means so as to allow said upper feed means to be moved upwardly toward said housing top opening and removal of said upper feed means through said housing top opening when said cover has been removed;

lower feed means mounted in said housing and cooperable with said upper feed means for conveying crop material to said comminuting means;

tensioning means interconnected to said upper feed means; and actuatable means mounted to said housing and interconnected to said tensioning means, at least one of said interconnection of said tensioning means with said upper feed means and of said tensioning means with said actuatable means being disconnectible, said actuatable means being movable to a first position for placing said tensioning means in a first condition in which said upper feed means is biased toward said lower feed means, said actuatable means also being movable to a second position for placing said tensioning means in a second condition in which said bias on said upper feed means is relaxed for facilitating disconnecting of one of said interconnections and thereby removal of said upper feed means through said housing top opening when said cover has been removed.

33. The combination as recited in claim 32, wherein:

said tensioning means comprises a pair of springs, each of said springs being interconnected to one of a pair of opposite ends of said upper feed means; and said actuatable means includes a shaft rotatably mounted to said housing and a crank member fixed to and extending generally radially outwardly from each opposite end of said shaft, each of said springs being interconnected to an outer end of one of said crank members.

34. The combination as recited in claim 33, further comprising:

a handle attached to one of said crank members for facilitating movement of said actuatable means between its first and second positions.

35. In a forage harvester, the combination comprising:

a housing having a top opening defined therein;

a removable cover for normally closing said housing top opening;

means mounted in said housing for comminuting crop material;

front and rear upper rotatable feed rolls generally tandemly-arranged in said housing generally below said top opening therein and forwardly of said comminuting means;

said housing including means supporting opposite ends of said respective upper rolls so as to allow said rolls to be moved upwardly toward said housing top opening and removal of said upper rolls through said housing top opening when said cover has been removed;

lower feed means mounted in said housing and cooperable with said upper feed rolls for conveying crop material to said comminuting means;

a pair of arms respectively rotatably connected to and extending between said opposite ends of said upper feed rolls for maintaining said upper rolls as a unit;

tensioning means interconnected to each of said arms; and actuatable means mounted to said housing and interconnected to said tensioning means, at least one of said interconnection of said tensioning means with said arms and of said tensioning means with said actuatable means being disconnectible, said actuatable means being movable to a first position for placing said tensioning means in a first condition in which said upper rolls are biased toward said lower feed means, said actuatable means also being movable to a second position for placing said tensioning means in a second condition in which said bias on said upper rolls is relaxed for facilitating disconnecting of one of said interconnections and thereby removal of said upper rolls as a unit through said housing top opening when said cover has been removed.

36. The combination as recited in claim 35, wherein:

said tensioning means comprises a pair of springs;

said actuatable means includes a shaft rotatably mounted to said housing and a crank member fixed to and extending generally radially outwardly from each opposite end of said shaft, each of said springs being interconnected to an outer end of one of said crank members.

37. The combination as recited in claim 36, further comprising:

a handle attached to one of said crank members for facilitating movement of said actuatable means between its first and second positions.

* * * * *

UNITED STATES PATENT OFFICE
CERTIFICATE OF CORRECTION

Patent No. 3,985,306　　　　　　　　　　Dated　October 12, 1976

Inventor(s) Robert A. Wagstaff and Henry N. Lausch

It is certified that error appears in the above-identified patent and that said Letters Patent are hereby corrected as shown below:

Column six, line 19, after "20," insert --while the front and rear upper feed rolls 22,30 are movable vertically with respect to the housing sidewalls 18,20,--.

Signed and Sealed this

Fourteenth Day of December 1976

[SEAL]

Attest:

RUTH C. MASON
Attesting Officer

C. MARSHALL DANN
Commissioner of Patents and Trademarks